(No Model.)

2 Sheets—Sheet 1.

C. E. CANDEE.
CAR AXLE BOX.

No. 366,760. Patented July 19, 1887.

WITNESSES:
John M. Deemer
C. Sedgwick

INVENTOR:
C. E. Candee
BY Munn & Co
ATTORNEYS.

(No Model.) 2 Sheets—Sheet 2.
C. E. CANDEE.
CAR AXLE BOX.
No. 366,760. Patented July 19, 1887.
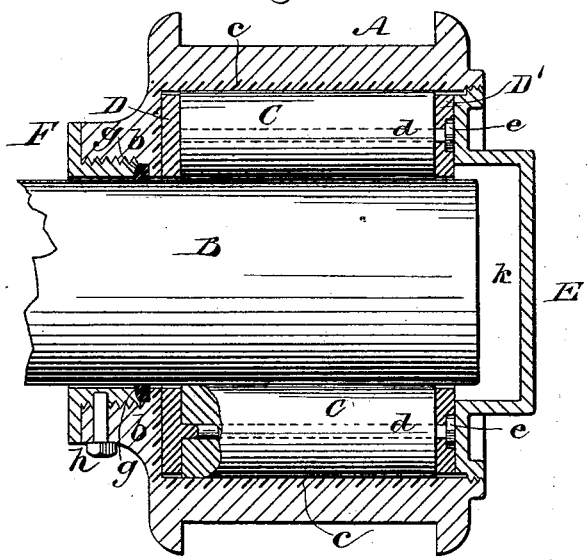
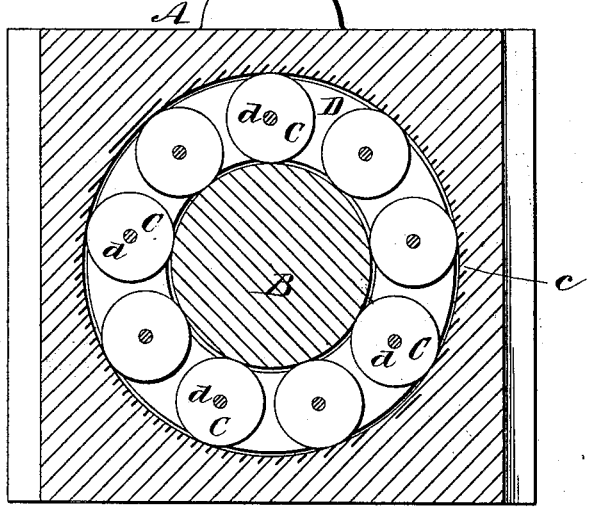
WITNESSES:
INVENTOR:
C. E. Candee
BY Munn & Co.
ATTORNEYS.

ps pellentesque

UNITED STATES PATENT OFFICE.

CHARLES E. CANDEE, OF NEW YORK, ASSIGNOR TO HIMSELF, AND ALBERT G. STORY, OF LITTLE FALLS, NEW YORK.

CAR-AXLE BOX.

SPECIFICATION forming part of Letters Patent No. 366,760, dated July 19, 1887.

Application filed April 16, 1886. Renewed June 23, 1887. Serial No. 242,279. (No model.)

*To all whom it may concern:*

Be it known that I, CHARLES E. CANDEE, of the city, county, and State of New York, have invented a new and useful Improvement in Axle-Boxes for Railroad-Car and other Axles or Shafts, of which the following is a full, clear, and exact description.

This invention more particularly relates to roller-bearing axle-boxes for railroad-car-wheel axles; and it consists in certain novel constructions and combinations of parts, substantially as hereinafter described, and pointed out in the claims.

Reference is to be had to the accompanying drawings, forming a part of this specification, in which similar letters of reference indicate corresponding parts in all the figures.

Figure 1:
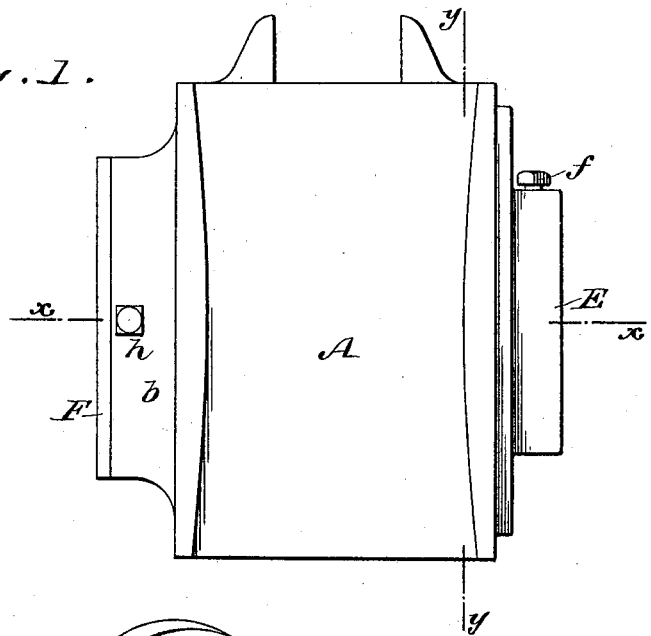
Figure 4:
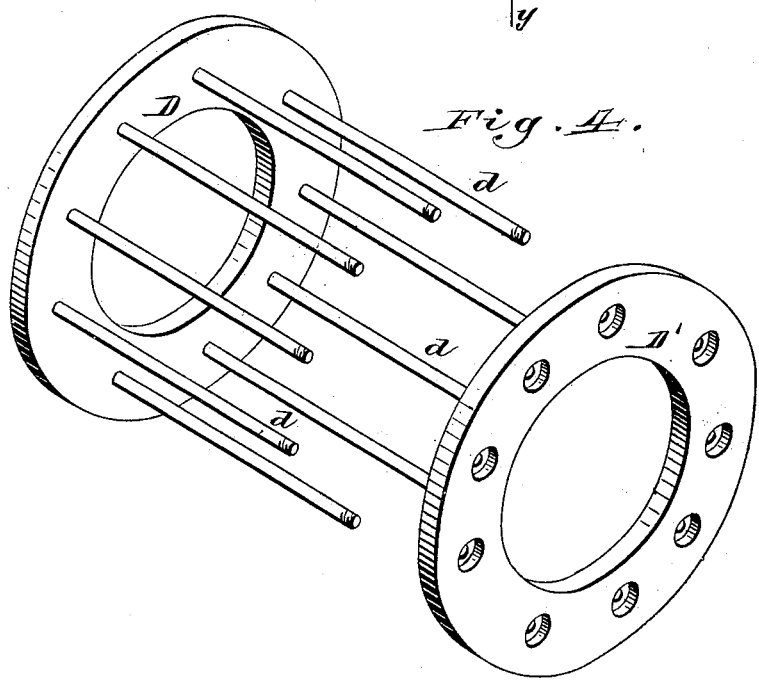

Figure 1 represents a side elevation of a railroad-car-wheel axle-box embodying my invention; Fig. 2, a horizontal section of the same upon the line *x x* in Fig. 1, and showing the axle in part; Fig. 3, a vertical or transverse section upon the line *y y* in Fig. 1, with the axle in place; and Fig. 4, a view in perspective of the roller-frame in course of construction, or before the same is put together, the rollers carried by the same being omitted.

A is the axle-box proper, which, instead of being made in sections or divided longitudinally, is cast all in one piece, as more clearly shown in Figs. 2 and 3. The outer end of said box is made without an inclosure, while its opposite or inner end is made with a partial head or inner flange, *b*, of a size to admit the axle B snugly through it. This box A, thus made all in one piece, and which is of cylindrical contour on its interior, is cast with a chilled-metal lining or interior surface, *c*, for rollers C, which support and are grouped around the axle to run in contact with it on the one side of their axes, while they bear or run in contact with the axle B on the opposite side of their axes. These rollers are carried by a roller-frame arranged within the axle-box, the whole forming a roller-bearing which is free to rotate around the axle and serves to reduce friction of the axle in its bearing, and the friction of the roller-bearing is still further reduced, and the durability of the box and of the rollers which come in contact with its interior surface greatly increased by making said surface *c* a chilled-metal one. By making the axle-box A open at its outer end provision is made for inserting the roller-bearing endwise from the exterior of the box.

The independently-rotatable roller-bearing is composed in part of the rollers C, arranged at equal distances apart, or thereabout, around a common center, and in part of a frame carrying said rollers, which is constructed substantially as follows: D D' are two rings, which carry the rollers C in between them by means of rod-like projections *d* from the face of one of them, D, and cast upon or integral with said ring. These rod-like projections are arranged to form independent axles for the rollers C, and project at their free or exposed ends beyond the rollers, where they enter the other ring, D', and are secured thereto by countersunk nuts *e*. This makes a very simple, stable, and cheap construction of roller-frame, the roller-axles by being a part of one of the rings of the frame requiring no separate securing means at one of their ends. Both rings D D' should be of such a size externally and internally as not to come in contact with the axle B or interior *c* of the box A, so as to avoid unnecessary friction. The interior of the box A, at or near its outer end, should be left without the chilled lining *c*, to provide for a cap-plate, E, being screwed into said end of the box. This cap-plate not only serves to exclude dirt and dust from the axle; but it is made with a small or projecting hollow body part, *k*, arranged to project beyond the end of the axle, the same forming an oil reservoir or chamber for lubricating, if necessary, the axle B and its bearing by oil introduced through a suitable aperture closed by a plug, *f*. The inner flange portion, *b*, at the opposite end of the box A, is fitted with a screw-threaded gland, F, arranged around the axle B, and bearing at its inner end, when screwed to its place, against a packing, *g*, that rests against an inner shouldered portion of the flange *b*. This serves to exclude dust from working past the axle into the box, and to retain any lubricating material that may be in the latter. Said gland is locked when in place by a screw, *h*.

It should be observed that the axle-box A, being cast all in one piece and of circular continuity on its interior walls, which are chilled to form a hard and durable bearing-surface integral with the shell of the box for the rollers C to run upon, admits of the box being repeatedly reversed or turned upside down, whereby the interior surfaces of the box exposed to wear will be changed and the durability of the box greatly increased, inasmuch as it is only the upper portion of the box that is at any one time subjected to wear by reason of the rollers only having to sustain the load or weight of the car and its load during their upper course of travel. The internally-chilled axle-box, therefore, of continuous interior circularity, so as to present both upper and lower chilled bearing-surfaces, will, in its application to railroad car-axles, be much more economical and lasting than those heretofore used, and the chilled surface is prevented from getting loose or being expanded or contracted out of shape.

I am aware that it is not new to make axle-boxes of different kinds all in one piece, nor yet to use independent chilled linings or sleeves; neither is it new to chill a part or half box, nor is it new, in the abstract, to chill parts of machinery that are to be subjected to frictional pressure. Such, therefore, I do not claim; but I am not aware that a reversible internally-chilled axle-box cast all in one piece and constructed so that its interior walls present upper and lower or continuous chilled bearing-surfaces integral with the shell of the box have ever before been used.

Having thus fully described my invention, I claim as new and desire to secure by Letters Patent—

1. The axle-box A, cast all in one piece and constructed to present upper and lower interior chilled walls or bearing-surfaces integral with the shell of the box, essentially as described.

2. In axle-boxes, the within-described independently-rotatable roller-bearing consisting of rollers C and a frame composed of an end ring, D, having the independent axles $d$ for said rollers integral portions of it, and a loose opposite end ring, D', secured upon the outer or exposed ends of said axles, substantially as specified.

CHARLES E. CANDEE.

Witnesses:
C. SEDGWICK,
JNO. MATHEW RITTER.